(12) United States Patent
Saha et al.

(10) Patent No.: US 11,955,907 B2
(45) Date of Patent: Apr. 9, 2024

(54) ROTATING ELECTRICAL MACHINE CONTROL SYSTEM

(71) Applicant: AISIN CORPORATION, Aichi (JP)

(72) Inventors: Subrata Saha, Anjo (JP); Shoji Nagata, Anjo (JP)

(73) Assignee: AISIN CORPORATION, Aichi (JP)

(*) Notice: Subject to any disclaimer, the term of this patent is extended or adjusted under 35 U.S.C. 154(b) by 115 days.

(21) Appl. No.: 17/428,054

(22) PCT Filed: Mar. 26, 2020

(86) PCT No.: PCT/JP2020/013577
§ 371 (c)(1),
(2) Date: Aug. 3, 2021

(87) PCT Pub. No.: WO2020/196719
PCT Pub. Date: Oct. 1, 2020

(65) Prior Publication Data
US 2022/0149753 A1 May 12, 2022

(30) Foreign Application Priority Data
Mar. 28, 2019 (JP) .................................. 2019-064416

(51) Int. Cl.
*G05B 11/28* (2006.01)
*H02K 11/215* (2016.01)
(Continued)

(52) U.S. Cl.
CPC ...... *H02M 7/53876* (2021.05); *H02K 11/215* (2016.01); *H02P 25/22* (2013.01); *H02P 27/06* (2013.01)

(58) Field of Classification Search
CPC ................................. H02P 25/22; H02P 27/06
(Continued)

(56) References Cited

U.S. PATENT DOCUMENTS

| 2010/0026216 A1* | 2/2010 | Atarashi ................. H02P 21/22 318/400.02 |
| 2012/0194109 A1 | 8/2012 | Uryu et al. |

(Continued)

FOREIGN PATENT DOCUMENTS

| JP | 2003-40123 A | 2/2003 |
| JP | 2012-161154 A | 8/2012 |

(Continued)

OTHER PUBLICATIONS

International Search Report for PCT/JP2020/013577, dated Jun. 23, 2020.

*Primary Examiner* — Erick D Glass
(74) *Attorney, Agent, or Firm* — Sughrue Mion, PLLC

(57) ABSTRACT

A rotating electrical machine control system (100) whose control target is an alternating-current rotating electrical machine (80) including M coil sets (8) includes M inverters (50) each including a plurality of switching elements (5) and connected to a direct-current power supply (41) and one of the coil sets (8) to convert electric power between a direct current and alternating currents of N phases; M current sensors (6) each provided for each coil set (8) to detect an alternating current of each phase flowing through the coil set (8); and an inverter control device (30) that generates switching control signals (S) for controlling the plurality of switching elements (5). The inverter control device (30) performs current feedback control of the rotating electrical machine (80) using all detection values for each of N phases obtained by the M current sensors (6), to generate the switching control signals (S) common to the M inverters (50).

4 Claims, 3 Drawing Sheets

(51) Int. Cl.
    *H02M 7/5387*    (2007.01)
    *H02P 25/22*     (2006.01)
    *H02P 27/06*     (2006.01)

(58) Field of Classification Search
    USPC .......................................................... 318/599
    See application file for complete search history.

(56) References Cited

U.S. PATENT DOCUMENTS

| | | | |
|---|---|---|---|
| 2014/0246999 A1* | 9/2014 | Kezobo | B60L 3/0061 |
| | | | 318/400.23 |
| 2017/0117833 A1* | 4/2017 | Mori | B62D 5/0487 |
| 2017/0237377 A1* | 8/2017 | Furukawa | H02P 29/028 |
| | | | 318/564 |
| 2017/0297616 A1* | 10/2017 | Kikuchi | H02P 27/06 |
| 2017/0346353 A1* | 11/2017 | Kitao | H02K 1/276 |
| 2018/0244308 A1* | 8/2018 | Furukawa | B62D 5/0484 |
| 2019/0260324 A1 | 8/2019 | Kuramitsu et al. | |
| 2020/0014323 A1 | 1/2020 | Chinen | |
| 2020/0162002 A1 | 5/2020 | Taniguchi et al. | |

FOREIGN PATENT DOCUMENTS

| | | |
|---|---|---|
| JP | 2016-21803 A | 2/2016 |
| JP | 2018-130007 A | 8/2018 |
| JP | 2019-022299 A | 2/2019 |
| WO | 2018/181945 A1 | 10/2018 |

\* cited by examiner

ROTATING ELECTRICAL MACHINE CONTROL SYSTEM

CROSS REFERENCE TO RELATED APPLICATIONS

This application is a National Stage of International Application No. PCT/JP2020/013577 filed Mar. 26, 2020, claiming priority based on Japanese Patent Application No. 2019-064416 filed Mar. 28, 2019, the entire contents of which are incorporated in their entirety.

TECHNICAL FIELD

The present disclosure relates to a rotating electrical machine control system whose control target is an alternating-current rotating electrical machine including a plurality of coil sets.

BACKGROUND ART

JP 2018-130007 A discloses a rotating electrical machine control device (10) that controls a rotating electrical machine (80) including stator windings (180 and 280) of a plurality of systems which are a plurality of coil sets (in the background art, reference signs in parentheses are those in the literature referred to.). The rotating electrical machine control device (10) drives each of the stator windings (180 and 280) of two systems through different and independent inverters (120 and 220). In addition, current feedback control of each of the inverters (120 and 220) is performed by different and independent control parts (131 and 231). Currents to be fed back are detected by current sensors (125 and 225) that are independent of the stator windings (180 and 280).

CITATIONS LIST

Patent Literature

Patent Literature 1: JP 2018-130007 A

SUMMARY OF DISCLOSURE

Technical Problems

The above-described rotating electrical machine control device (10) needs to include the two inverters (120 and 220) and the two control parts (131 and 231) for controlling the two inverters (120 and 220), respectively, by which device cost has been likely to increase. Meanwhile, when control is performed by allowing currents of the same phase to flow through stator windings of two systems, all drive devices (inverters and control circuits) for allowing currents to flow through the two stator windings (180 and 280) may not need to be provided independently of their corresponding stator windings (180 and 280), as in the rotating electrical machine control device (10). In a rotating electrical machine including a plurality of stator windings, the stator windings often have the same configuration and the same electrical specifications, and in such a case, for example, by one control circuit controlling two inverters provided for two stator windings, the miniaturization and cost reduction of a system can be achieved. For example, two inverters can be controlled by outputting the same control signals to the two inverters from one control device.

As such, when a plurality of stator windings have the same configuration and the same electrical specifications and a control circuit is of one system, it is possible to perform current feedback control by detecting feedback currents only on an alternating-current side of either one of the inverters (or one of the stator windings). However, even when the specifications are identical, since there are individual differences between the two stator windings and the two inverters, currents to flow are not always completely identical. Hence, when current feedback control is performed using only currents passing through either one of the inverters, there is a possibility of an increase in the torque ripple or vibration of the rotating electrical machine.

In view of the above-described background, a technique is sought that allows a system whose control target is an alternating-current rotating electrical machine including a plurality of coil sets to suppress an increase in its size along with an increase in the number of coil sets and to be able to appropriately control a rotating electrical machine by suppressing torque ripple, vibration, etc.

Solutions to Problems

In one aspect, a rotating electrical machine control system whose control target is an alternating-current rotating electrical machine including M coil sets (M is a natural number greater than or equal to 2) of N phases (N is a natural number), and which takes into account the above description includes: M inverters each including a plurality of switching elements and connected to a direct-current power supply and one of the coil sets to convert electric power between a direct current and alternating currents of N phases; M current sensors each provided for one of the coil sets of N phases to detect an alternating current of each phase flowing through the coil set; and an inverter control device that generates switching control signals for controlling the plurality of switching elements, to control the inverters, and the inverter control device performs current feedback control of the rotating electrical machine using all detection values for each of N phases obtained by the M current sensors, to generate the switching control signals common to the M inverters.

According to this configuration, all of the M inverters are controlled by the same switching control signals. Therefore, even when the rotating electrical machine includes a plurality of coil sets, an increase in the size of the rotating electrical machine control system according to the number of coil sets is suppressed. In addition, the inverter control device that controls the M inverters performs current feedback control using all detection values of currents flowing through all of the M coil sets. For example, there is a case in which even when a configuration and electrical specifications are the same between all of the M coil sets and between all of the M inverters, there is a difference in electrical characteristics due to individual differences. By the inverter control device performing current feedback control using detection values obtained by all of the M current sensors, an error in control resulting from such individual differences can be suppressed. As such, according to this configuration, a system whose control target is an alternating-current rotating electrical machine including a plurality of coil sets suppresses an increase in its size along with an increase in the number of coil sets, and can appropriately control the rotating electrical machine by suppressing torque ripple, vibration, etc.

Further features and advantages of the rotating electrical machine control system will become clear from the following description of an embodiment which will be described with reference to drawings.

DESCRIPTION OF EMBODIMENTS

Figure 1:
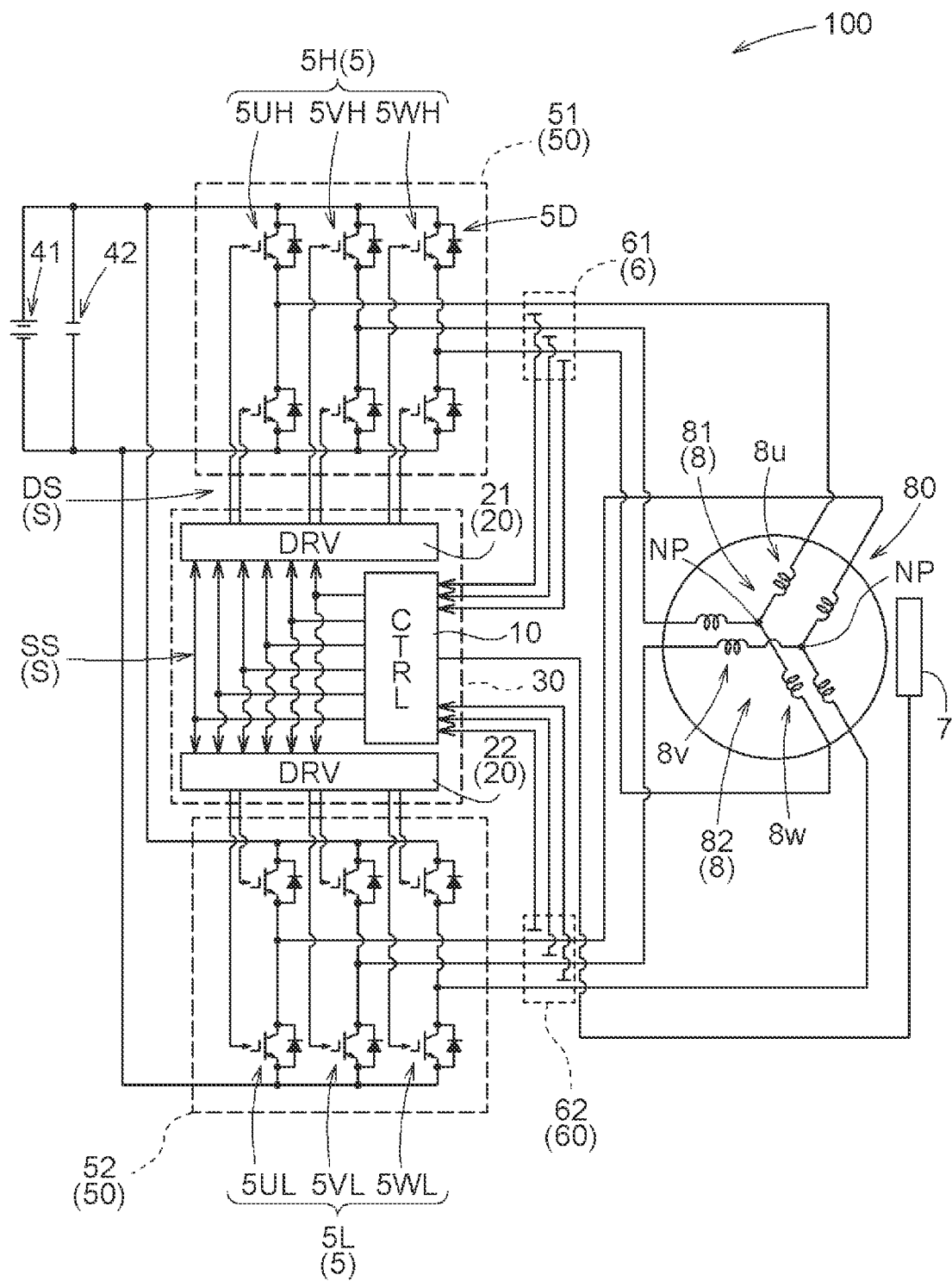
FIG. 1 is a block diagram showing an example of a rotating electrical machine control system.

An embodiment of a rotating electrical machine control system will be described below based on the drawings. The rotating electrical machine control system controls drive of a rotating electrical machine serving as, for example, a vehicle's drive power source. A block diagram of FIG. 1 schematically shows a system configuration of a rotating electrical machine control system 100. A control target of the rotating electrical machine control system 100 is an alternating-current rotating electrical machine 80 including M coil sets 8 (M is a natural number greater than or equal to 2) of N phases (N is a natural number). The M coil sets 8 are the coil sets 8, all having the same specifications (the same configuration and the same electrical specifications), and in the present embodiment, the M coil sets 8 all are coil sets 8 of three phases (N=3). In addition, the present embodiment exemplifies a mode in which the rotating electrical machine 80 includes two (M=2) coil sets 8: a first coil set 81 and a second coil set 82.

Figure 3:
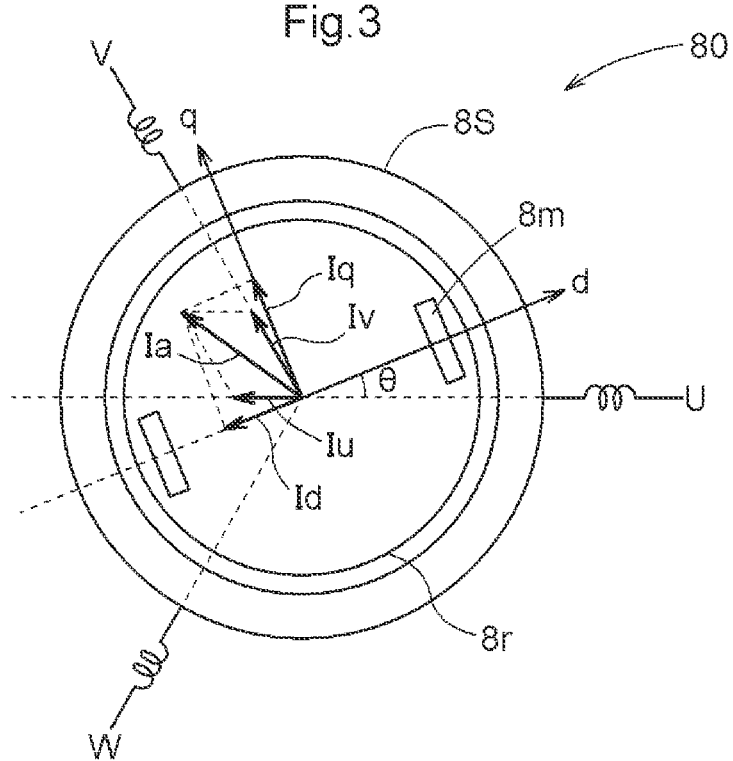
FIG. 3 is an explanatory diagram showing a relationship between a d-q-axis orthogonal vector coordinate system and a three-phase coordinate system.

The rotating electrical machine 80 to be driven by the rotating electrical machine control system 100 is a permanent magnet synchronous motor (PMSM) including a stator 8s having the two coil sets 8 disposed on a stator core (see FIG. 3); and a rotor 8r having permanent magnets 8m disposed in a rotor core (see FIG. 3). As shown in FIG. 1, the present embodiment exemplifies the star-connected (Y-connected) coil sets 8 in which stator coils of three phases (8u, 8v, and 8w) are short-circuited at a neutral point NP. However, the number of phases, a connection method (star connection or delta connection), how to wind the stator coils (8u, 8v, and 8w) (distributed winding or concentrated winding), etc., are not limited. Note that the rotating electrical machine 80 can function as an electric motor and as a generator.

The rotating electrical machine control system 100 includes M inverters 50 each connected to a direct-current power supply 41 and one of the coil sets 8 to convert electric power between a direct current and alternating currents of N phases. In the present embodiment, as shown in FIG. 1, the rotating electrical machine control system 100 includes a first inverter 51 connected to the direct-current power supply 41 and the first coil set 81 to convert electric power between a direct current and alternating currents of N phases (here, three phases); and a second inverter 52 connected to the direct-current power supply 41 and the second coil set 82 to convert electric power between a direct current and alternating currents of N phases (here, three phases). That is, the rotating electrical machine control system 100 includes the two inverters 50 provided for the two coil sets 8. The first inverter 51 and the second inverter 52 are the inverters 50 of the same specifications (the same configuration and the same electrical specifications).

The direct-current power supply 41 is composed of, for example, a rechargeable secondary battery (battery) such as a lithium-ion battery, or an electric double-layer capacitor. When the rotating electrical machine 80 is a vehicle's drive power source, the direct-current power supply 41 is a high-voltage, large-capacity direct-current power supply and has a rated power supply voltage of, for example, 200 to 400 [V]. On a direct-current side of the inverters 50 there is provided a smoothing capacitor (direct-current link capacitor 42) that smooths out a voltage between positive and negative (direct-current link voltage).

Each inverter 50 is configured to include a plurality of switching elements 5. For the switching elements 5, it is preferred to apply power semiconductor devices such as insulated gate bipolar transistors (IGBTs), power metal oxide semiconductor field effect transistors (MOSFETs), silicon carbide-metal oxide semiconductor FETs (SiC-MOSFETs), SiC-static induction transistors (SiC-SITs), and gallium nitride-MOSFETs (GaN-MOSFETs). FIG. 1 exemplifies a mode in which IGBTs are used as the switching elements 5. Note that each switching element 5 includes a freewheeling diode 5d in parallel thereto, with a direction going from negative to positive (a direction going from a lower-stage side to an upper-stage side) being a forward direction.

Each inverter 50 includes a plurality of (here, three) arms, each for one phase of alternating current and including a series circuit of an upper-stage-side switching element 5H and a lower-stage-side switching element 5L. In the present embodiment, a bridge circuit is formed in which one series circuit (arm) is provided for each of the stator coils (8u, 8v, and 8w) corresponding to a U-phase, a V-phase, and a W-phase of each coil set 8. A midpoint of each arm, i.e., a connecting point between an upper-stage-side switching element 5H and a lower-stage-side switching element 5L, is connected to one of the stator coils (8u, 8v, and 8w) corresponding to the U-phase, V-phase, and W-phase of each coil set 8.

As shown in FIG. 1, each inverter 50 is controlled by an inverter control device 30. The inverter control device 30 includes a control circuit 10 (CTRL) and drive circuits 20 (DRV). FIG. 1 (and FIG. 2) exemplifies a mode in which the two (M) drive circuits 20 are provided for the two (M) inverters 50. Namely, a first drive circuit 21 is provided for the first inverter 51, and a second drive circuit 22 is provided for the second inverter 52. All drive circuits 20 have the same specifications (the same configuration and the same electrical specifications), and the first drive circuit 21 and the second drive circuit 22 are the drive circuits 20 of the same specifications (the same configuration and the same electrical specifications). Though details will be described later, the control circuit 10 is provided so as to be shared between the two inverters 50, and generates switching control signals S (source signals SS) for controlling the plurality of switching elements 5 in the first inverter 51 and the second inverter 52, to control the first inverter 51 and the second inverter 52. Namely, the control circuit 10 generates switching control signals S (source signals SS) for the inverters 50 to control all of the M inverters 50.

The control circuit 10 is constructed using, as a core member, a processor such as a microcomputer. For example, the control circuit 10 controls the rotating electrical machine 80 through the inverters 50 by performing current feedback control that uses a vector control method, based on target torque (torque instruction T*: see FIG. 2, etc.) of the rotating electrical machine 80 which is provided as a request signal from another control device, etc., such as a vehicle control device (not shown) which is one of higher-level control devices. As shown in FIG. 3, in the vector control method, feedback control is performed by transforming the coordinates of actual currents (In: Iu, Iv, and Iw) flowing through the rotating electrical machine into vector components (Id and Iq) on a d-axis indicating a direction of a magnetic field (magnetic flux) generated by the permanent magnets 8m disposed in the rotor 8r and a q-axis indicating a direction orthogonal to the d-axis (a direction advanced by an electrical angle of π/2 relative to the direction of the magnetic field). Note that "Ia" indicates a combined current obtained by combining vectors. As will be described later with reference to FIG. 2, the inverter control device 30 (control circuit 10) performs feedback control of the rotating electrical machine 80 in a d-q-axis orthogonal vector coordinate system, based on deviation between current instructions (I*) obtained based on a torque instruction T* for the rotating electrical machine 80 and actual currents In.

Figure 2:
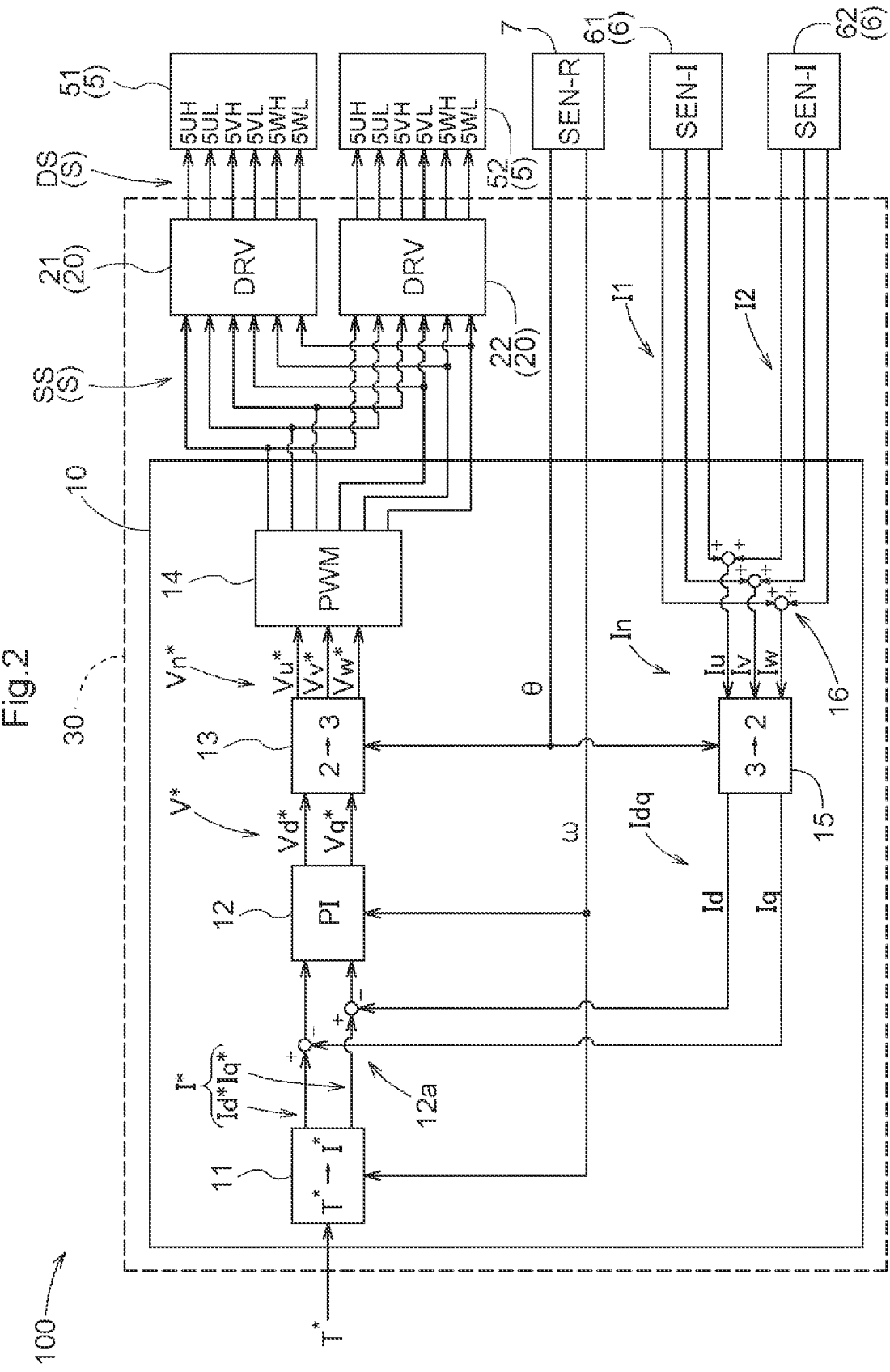
FIG. 2 is a block diagram showing an example of an inverter control device.

As shown in FIGS. 1 and 2, actual currents In flowing through the rotating electrical machine 80 are detected by two (M) current sensors 6 (SEN-I), and the control circuit 10 obtains results of the detection. One current sensor 6 is provided for one coil set 8 of N phases, and detects an alternating current of each phase flowing through the coil set 8. In the present embodiment, as shown in FIG. 1, two current sensors 6 (61 and 62) are provided for the two coil sets 8 (81 and 82).

The actual currents In flow through both of the first coil set 81 and the second coil set 82 (all of the M coil sets 8). To detect currents flowing through all of the M coil sets 8, the M current sensors 6 are provided. In the present embodiment, there are provided the first current sensor 61 that detects an alternating current of each phase flowing through the first coil set 81 and the second current sensor 62 that detects an alternating current of each phase flowing through the second coil set 82. Although FIG. 1 exemplifies a mode in which the current sensors 6 detect alternating currents of three phases, in a case of, for example, three-phase alternating currents, three phases are balanced and the sum of instantaneous values thereof is zero, and thus, currents of only two phases may be detected and the remaining one phase may be obtained by computation by the control circuit 10. That is, each current sensor 6 (61, 62) does not necessarily need to include N detecting parts corresponding to all of the N phases, and may be configured to include (N−1) detecting parts. Since a current value obtained by computation can also be considered as a detection value, in this case, too, the inverter control device 30 performs current feedback of the rotating electrical machine 80, using all detection values of currents of each of the N phases.

In addition, the magnetic pole position (electrical angle θ: see FIG. 3) at each time point of the rotor 8r of the rotating electrical machine 80 and the rotational speed (angular velocity ω) of the rotor 8r are detected by a rotation sensor 7 (SEN-R), e.g., a resolver, and the control circuit 10 obtains results of the detection. The control circuit 10 performs current feedback control using results of detection by the current sensors 6 and the rotation sensor 7.

As shown in FIG. 2, the control circuit 10 is configured to include various functional parts for current feedback control, and each functional part is implemented by the cooperation of hardware such as a microcomputer and software (program). In the present embodiment, the control circuit 10 includes a current instruction computing part 11, a voltage instruction computing part 12, a two-to-three phase coordinate transforming part 13, a modulating part 14, a three-to-two phase coordinate transforming part 15, and an actual current computing part 16. The inverter control device 30 (control circuit 10) transforms actual currents In which are alternating currents of N phases into two-phase currents Idq (Id and Iq) in the d-q-axis orthogonal vector coordinate system, computes two-phase voltage instructions V* (Vd* and Vq*) in the d-q-axis orthogonal vector coordinate system based on deviation between two-phase current instructions I* (Id* and Iq*) which are current instructions in the d-q-axis orthogonal vector coordinate system and the two-phase currents Idq (Id and Iq), transforms the two-phase voltage instructions V* (Vd* and Vq*) into N-phase voltage instructions (here, three-phase voltage instructions Vn* (Vu*, Vv*, and Vw*)) to be applied to the first coil set 81 of N phases and the second coil set 82 of N phases, and generates switching control signals S (source signals SS) based on the N-phase voltage instructions (Vn*: Vu*, Vv*, and Vw*).

The current instruction computing part 11 computes target currents (two-phase current instructions I*) that flow through the rotating electrical machine 80, based on a torque instruction T* (target torque). As described above, since the control circuit 10 performs feedback control of the rotating electrical machine 80 in the d-q-axis orthogonal vector coordinate system, the current instruction computing part 11 computes, as current instructions I*, a d-axis current instruction Id* and a q-axis current instruction Iq*. Here, the current instruction computing part 11 may "compute two-phase current instructions I*, with currents flowing through one coil set 8 being target currents" or may "compute two-phase current instructions I*, with currents which are obtained by summing currents flowing through the first coil set 81 and currents flowing through the second coil set 82 (currents obtained by summing currents flowing through all of the M coil sets 8) being target currents". When the current instruction computing part 11 "computes two-phase current instructions I*, with currents flowing through one coil set 8 being target currents", a torque instruction T* is ½ of the entire target torque of the rotating electrical machine 80. In this case, torque instructions T* for the respective coil sets 8 are identical, and sets of two-phase current instructions I* for the respective coil sets 8 are also identical.

The voltage instruction computing part 12 computes two-phase voltage instructions V* which are instructions on voltages to be applied to the inverters 50, based on deviation between the two-phase current instructions I* and the actual currents In (a U-phase current Iu, a V-phase current Iv, and a W-phase current Iw) of the rotating electrical machine 80. Although here a mode is exemplified in which the voltage instruction computing part 12 is configured to include a proportional-integral controller (PI), the voltage instruction computing part 12 may be configured to include a proportional-integral-derivative controller (PID).

In the present embodiment, the inverter control device 30 (control circuit 10) performs current feedback control of the rotating electrical machine 80 using first detection values I1 which are detection values for the respective N phases (here, three phases) obtained by the first current sensor 61 and second detection values I2 which are detection values for the respective N phases (here, three phases) obtained by the second current sensor 62. Hence, as shown in FIG. 2, the control circuit 10 includes the actual current computing part 16 that determines actual currents In flowing through the rotating electrical machine 80, based on the first detection values I1 and the second detection values I2.

When the current instruction computing part 11 "computes two-phase current instructions I*, with currents flowing through one coil set 8 being target currents", the actual current computing part 16 determines actual currents In flowing through the rotating electrical machine 80 by averaging first detection values I1 and second detection values I2 as shown in the following equations (1) to (3) (the following equations exemplify a case of "M=2".).

$$Iu=+Iu2)/2 \quad (1)$$

$$Iv=(Iv1+Iv2)/2 \quad (2)$$

$$Iw=(Iw1+Iw2)/2 \quad (3)$$

The actual current computing part 16 is configured to include adders, and can compute an actual current In by adding together a first detection value I1 and a second detection value I2 that are obtained at the same timing, and dividing a result of the addition by two. The control circuit 10 that uses a microcomputer as a core performs computation using binary numbers. Hence, in a case of "M=2" as in the present embodiment, by performing a bit shift (in this case, a right shift) on a result of addition, the result of addition is easily divided by two, by which an average can be determined (including rounding up, rounding down, and rounding off of a fraction.). When the current instruction computing part 11 has computed two-phase current instructions I*, with currents flowing through one coil set 8 being target currents, a deviation computing part 12a computes deviation between the two-phase current instructions I* and actual currents In which are averaged as current values per coil set 8 by the actual current computing part 16. As shown in FIG. 2, the deviation computing part 12a is configured to include adders (subtractors).

When the current instruction computing part 11 "computes two-phase current instructions I*, with currents which are obtained by summing currents flowing through the first coil set 81 and currents flowing through the second coil set 82 (currents obtained by summing currents flowing through all of the M coil sets 8) being target currents, the actual current computing part 16 determines actual currents In flowing through the rotating electrical machine 80 by summing first detection values I1 and second detection values I2. The actual current computing part 16 is configured to include adders, and computes an actual current In by adding together a first detection value I1 and a second detection value I2 that are obtained at the same timing. In this case, two-phase current instructions I* are computed, with currents which are obtained by summing currents flowing through the first coil set 81 and currents flowing through the second coil set 82 being target currents, and the deviation computing part 12a computes deviation between the two-phase current instructions I* and the actual currents In which are summed by the actual current computing part 16.

Although in the above description the case of "M=2" is exemplified and described, the actual current computing part 16 determines actual currents In flowing through the rotating electrical machine 80 by averaging detection values obtained by the M current sensors 6 (by adding together all detection values obtained by the M current sensors 6 and dividing a result of the addition by M). Alternatively, the actual current computing part 16 determines actual currents In flowing through the rotating electrical machine 80 by adding together all detection values obtained by the M current sensors 6 for the M coil sets 8.

Since the deviation computing part 12a computes deviation from the two-phase current instructions I*, the three-to-two phase coordinate transforming part 15 transforms the coordinates of the actual currents In (Iu, Iv, and Iw) into two-phase currents Idq (Id and Iq) (see FIG. 3 for a concept of coordinate transformation). The three-to-two phase coordinate transforming part 15 performs coordinate transformation based on a rotational position (a magnetic pole position and an electrical angle θ) at each time point of the rotor 8r which is detected by the rotation sensor 7 (SEN-R).

FIG. 2 exemplifies a mode in which the deviation computing part 12a provided between the current instruction computing part 11 and the voltage instruction computing part 12 computes deviation between two-phase currents Idq (a d-axis current Id and a q-axis current Iq) transformed by the three-to-two phase coordinate transforming part 15 and a d-axis current instruction Id* and a q-axis current instruction Iq*. However, the deviation computing part 12a may be included in the voltage instruction computing part 12, and the voltage instruction computing part 12 may compute deviation. The voltage instruction computing part 12 computes a d-axis voltage instruction Vd* based on the deviation between the d-axis current instruction Id* and the d-axis current Id and rotational speed (angular velocity ω), and computes a q-axis voltage instruction Vq* based on the deviation between the q-axis current instruction Iq* and the q-axis current Iq and rotational speed (angular velocity ω).

The two-to-three phase coordinate transforming part 13 transforms the coordinates of the two-phase voltage instructions V* (the d-axis voltage instruction Vd* and the q-axis voltage instruction Vq*) in the d-q-axis orthogonal vector coordinate system into three-phase voltage instructions Vn* (a U-phase voltage instruction Vu*, a V-phase voltage instruction Vv*, and a W-phase voltage instruction Vw*) corresponding to the inverters 50 of three phases.

The modulating part 14 generates switching control signals S (source signals SS) for the three phases of the inverters 50, based on each of the three-phase voltage instructions Vn* (the U-phase voltage instruction Vu*, the V-phase voltage instruction Vv*, and the W-phase voltage instruction Vw*). As shown in FIG. 2, since switching control signals S (source signals SS) that control the upper-stage-side switching elements 5H and the lower-stage-side switching elements 5L for the U-phase, the V-phase, and the W-phase are generated, six switching control signals S (source signals SS) in total are generated. Here, a mode is exemplified in which the modulating part 14 generates switching control signals by pulse width modulation (PWM) control.

A control terminal (e.g., a gate terminal of an IGBT) of each switching element 5 included in each inverter 50 is connected to the control circuit 10 through a corresponding drive circuit 20, and switching control is individually performed for each switching element 5. The control circuit 10 that generates source signals SS of switching control signals S includes, as described above, a microcomputer, etc., as a core, and the operating voltage thereof is, for example, 5 [V], 3.3 [V], or 2.5 [V]. On the other hand, the inverters 50 are, as described above, connected to the direct-current power supply 41 having a rated power supply voltage of, for example, 200 to 400 [V], and a drive signal of, for example, 15 to 20 [V] needs to be inputted to the control terminals of the switching elements 5.

The drive circuits 20 improve each of driving capabilities (capabilities to allow a circuit at a subsequent stage to operate, e.g., voltage amplitude and output current) of the source signals SS of the switching control signals S generated by the control circuit 10, and relay the source signals SS to the inverters 50. When the source signals SS generated by the control circuit 10 are distinguished from signals outputted from the drive circuits 20, the signals are referred to as drive signals DS. In addition, the source signals SS and the drive signals DS are collectively referred to as switching control signals S. Namely, the inverter control device 30 generates switching control signals S or generates and outputs switching control signals S, and more specifically, the inverter control device 30 generates source signals SS and outputs the source signals SS as drive signals DS.

As described above, the first coil set 81 and the second coil set 82 (all of the M coil sets 8) have the same configuration and also have the same electrical specifications, except individual differences. In addition, the first inverter 51 and the second inverter 52 (all of the M inverters 50) also have the same configuration and have the same electrical specifications, except individual differences. In the present embodiment, switching control of the two inverters 50 is performed at the same timing. Hence, switching control of the two inverters 50 (all of the M inverters 50) is performed by common switching control signals S (drive signals DS). Therefore, the inverter control device 30 generates switching control signals S (source signals SS and drive signals DS) common to the first inverter 51 and the second inverter 52 (all of the M inverters 50).

As shown in FIGS. 1 and 2, in the present embodiment, the control circuit 10 generates source signals SS common to the first inverter 51 and the second inverter 52 (all of the M inverters 50), and provides to the inverters 50 drive signals DS relayed by the different drive circuits 20 based on the same source signals SS. That is, drive signals DS relayed by the first drive circuit 21 based on the same source signals SS are provided to the first inverter 51, and drive signals DS relayed by the second drive circuit 22 based on the same source signals SS are provided to the second inverter 52. In this mode, control terminals (in this case, gate terminals) of switching elements 5 (e.g., upper-stage-side switching elements 5H of the U-phase) whose switching control is performed at the same timing in both inverters 50 (all of the M inverters 50) are separated from each other by sandwiching the drive circuits 20 therebetween, and thus, the switching elements 5 are suppressed from influencing each other due to individual differences.

Figure 4:
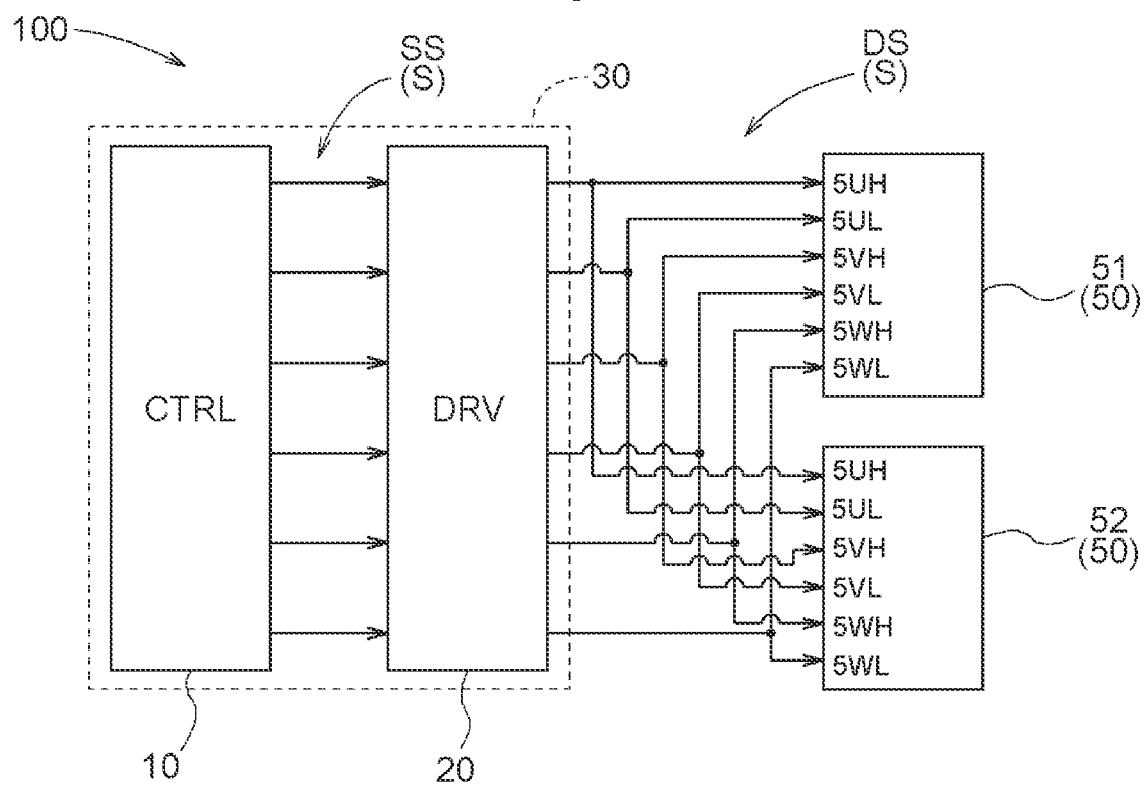
FIG. 4 is a block diagram showing another example of an inverter control device.

However, for example, when the influence between the switching elements 5 is negligible, the mode is not limited thereto. As shown in FIG. 4, drive signals DS outputted from the same drive circuit 20 may be provided to the different inverters 50. In this case, since the number of drive circuits 20 can be suppressed, the miniaturization and cost reduction of the rotating electrical machine control system 100 can be achieved.

Meanwhile, when, as described above, the coil sets 8 have the same configuration and the same electrical specifications and the inverters 50 have the same configuration and the same electrical specifications and are controlled by a single control circuit 10 (single inverter control device 30), a plurality of current sensors 6 do not need to be provided as they are in the present embodiment. For example, in a case of "M=2", by performing feedback control by detecting alternating currents only on an alternating-current side of either one of the inverters 50 (one of the coil sets 8), both inverters 50 can be driven by the same switching control signals S (source signals SS). For the other inverter 50 (the other coil set 8), for example, an overcurrent detection circuit using a shunt resistor, etc., is provided, by which the other inverter 50 can be prepared for the time of failure, etc. When M is three or more, too, by performing feedback control by detecting alternating currents only in an arbitrary number of coil sets 8 less than or equal to (M−1), all of the M inverters 50 can be driven by the same switching control signals S (source signals SS). For an inverter 50 (coil set 8) that does not detect alternating currents, as described above, for example, an overcurrent detection circuit using a shunt resistor, etc., is provided.

However, there is a case in which even when specifications are identical, alternating currents flowing through the first coil set 81 differ from alternating currents flowing through the second coil set 82 due to individual differences between the coil sets 8, individual differences between the switching elements 5 included in the inverters 50, etc. That is, there is a case in which alternating currents flowing through the M coil sets 8 vary from each other. Due to this, when feedback control of currents flowing through both coil sets 8 is performed based on currents flowing through either one of the coil sets 8, there is a possibility that a difference between currents flowing through both coil sets 8 may increase due to an error. That is, when feedback control of currents flowing through all of the M coil sets 8 is performed based on currents flowing through one or more of the M coil sets 8, there is a possibility that a difference between currents flowing through the coil sets 8 may increase due to an error. Namely, there is a possibility that a difference between currents obtained based on a torque instruction T* (target torque) and currents that actually flow through the rotating electrical machine 80 may increase. Such a current difference causes torque fluctuations of the rotating electrical machine 80.

However, as described above, by performing feedback control based on average values of first detection values I1 which are detection values of currents flowing through the first coil set 81 and second detection values I2 which are detection values of currents flowing through the second coil set 82, or based on summed values, currents obtained based on a torque instruction T* (target torque) can flow through the rotating electrical machine 80. That is, by performing feedback control using average values of detection values for each of the N phases obtained by the M current sensors 6 or all added values, currents obtained based on a torque instruction T* (target torque) can flow through the rotating electrical machine 80. Hence, the rotating electrical machine 80 can output torque determined based on the torque instruction T*, and torque fluctuations can be suppressed.

Needless to say, feedback control of a first system including the first coil set 81 and the first inverter 51 and a second system including the second coil set 82 and the second inverter 52 can also be performed in different control loops. That is, according to M systems, feedback control can also be performed in M control loops. However, in this case, a plurality of control circuits 10 such as that exemplified in FIGS. 1 and 2 are required. Alternatively, a single control circuit 10 needs to be time-shared, increasing a computation load on a processor such as a microcomputer which is a core of the control circuit 10, and in some cases there arises the need to use a processor with high computing capabilities. Hence, there is a possibility of an increase in the size or cost of the rotating electrical machine control system 100.

As described above, in the present embodiment, the coil sets 8 and the inverters 50 of two systems can be controlled by a single control circuit 10. That is, the coil sets 8 and the inverters 50 of a plurality of systems (M) can be controlled by a single control circuit 10. Therefore, an increase in the size or cost of the rotating electrical machine control system 100 can be suppressed. As such, according to the present embodiment, the rotating electrical machine control system 100 whose control target is the alternating-current rotating electrical machine 80 including the plurality of coil sets 8 suppresses an increase in its size along with an increase in the number of coil sets 8, and can appropriately control the rotating electrical machine 80 by suppressing torque ripple, vibration, etc.

In the above description, the rotating electrical machine control system 100 whose control target is the alternating-current rotating electrical machine 80 including the first coil set 81 of N phases (N is a natural number) and the second coil set 82 of N phases is exemplified and described. Specifically, a mode is exemplified in which the rotating electrical machine control system 100 includes the first inverter 51 connected to the direct-current power supply 41 and the first coil set 81 to convert electric power between a direct current and alternating currents of N phases; a second inverter 52 connected to the direct-current power supply 41 and the second coil set 82 to convert electric power between a direct current and alternating currents of N phases; one first current sensor 61 provided for one coil set 8 of N phases to detect an alternating current of each phase flowing through the first coil set 81; one second current sensor 62 provided for one coil set 8 of N phases to detect an alternating current of each phase flowing through the second coil set 82; and the inverter control device 30 that generates switching control signals S for the first inverter 51 and the second inverter 52 to control the first inverter 51 and the second inverter 52, and the inverter control device 30 performs current feedback control of the rotating electrical machine 80 using first detection values I1 which are detection values for the respective N phases obtained by the first current sensor 61 and second detection values I2 which are detection values for the respective N phases obtained by the second current sensor 62, to generate switching control signals S common to the first inverter 51 and the second inverter 52. This mode exemplifies a case of "M=2", but as exemplified as appropriate, a case of M being three or more can also be easily understood by a person skilled in the art, and thus, a detailed description thereof is omitted.

[Summary of the Embodiment]

A summary of a rotating electrical machine control system (100) described above will be briefly described below.

In one aspect, a rotating electrical machine control system (100) whose control target is an alternating-current rotating electrical machine (80) including M coil sets (8) (M is a natural number greater than or equal to 2) of N phases (N is a natural number) includes M inverters (50) each including a plurality of switching elements (5) and connected to a direct-current power supply (41) and one of the coil sets (8) to convert electric power between a direct current and alternating currents of N phases; M current sensors (6) each provided for one of the coil sets (8) of N phases to detect an alternating current of each phase flowing through the coil set (8); and an inverter control device (30) that generates switching control signals (S) for controlling the plurality of switching elements (5), to control the inverters (50), and the inverter control device (30) performs current feedback control of the rotating electrical machine (80) using all detection values for each of N phases obtained by the M current sensors (6), to generate the switching control signals (S) common to the M inverters (50).

According to this configuration, all of the M inverters (50) are controlled by the same switching control signals (S). Thus, even when the rotating electrical machine (80) includes a plurality of coil sets (8), an increase in the size of the rotating electrical machine control system (100) according to the number of coil sets (8) is suppressed. In addition, the inverter control device (30) that controls the M inverters (50) performs current feedback control using all detection values of currents flowing through the M coil sets (8). For example, there is a case in which even when a configuration and electrical specifications are the same between all of the M coil sets (8) and between all of the M inverters (50), there is a difference in electrical characteristics due to individual differences. By the inverter control device (30) performing current feedback control using detection values obtained by all of the M current sensors (6), an error in control resulting from such individual differences can be suppressed. As such, according to this configuration, the system (100) whose control target is the alternating-current rotating electrical machine (80) including the plurality of coil sets (8) suppresses an increase in its size along with an increase in the number of coil sets (8), and can appropriately control the rotating electrical machine (80) by suppressing torque ripple, vibration, etc.

Here, it is preferred that the inverter control device (30) perform current feedback control of the rotating electrical machine (80) by determining actual currents (In) flowing through the rotating electrical machine (80) by averaging detection values obtained by the M current sensors (6), or by determining actual currents flowing through the rotating electrical machine (80) by adding together all detection values obtained by the M current sensors (6).

Switching control signals (S) generated by and outputted from the inverter control device (30) correspond to one inverter (50) and one coil set (8), and thus, currents flowing through one coil set (8) through one inverter (50) are about (1/M) of currents flowing through the rotating electrical machine (80). Thus, by performing current feedback control by determining actual currents (In) by averaging detection values obtained by the M current sensors (6), the rotating electrical machine (80) can be appropriately controlled. In addition, the sum of detection values obtained by the M current sensors (6) is currents flowing through the rotating electrical machine (80), and the rotating electrical machine (80) outputs torque according to the currents. Thus, by performing current feedback control by determining actual currents (In) by adding together all detection values obtained by the M current sensors (6), too, the rotating electrical machine (80) can be appropriately controlled.

Here, it is preferred that the inverter control device (30) perform feedback control of the rotating electrical machine (80) in a d-q-axis orthogonal vector coordinate system, based on deviation between current instructions (I*) obtained based on target torque (T*) of the rotating electrical machine (80) and the actual currents (In), the d-q-axis orthogonal vector coordinate system having a d-axis indicating a direction of a magnetic flux of permanent magnets (8*m*) provided in a rotor (8*r*) of the rotating electrical machine (80) and a q-axis orthogonal to the d-axis, and the inverter control device (30) transform the actual currents (In) which are alternating currents of N phases into two-phase currents (Idq) in the d-q-axis orthogonal vector coordinate system, compute two-phase voltage instructions (V*) in the d-q-axis orthogonal vector coordinate system, based on deviation between two-phase current instructions (I*) which are the current instructions (I*) in the d-q-axis orthogonal vector coordinate system and the two-phase currents (Idq), transform the two-phase voltage instructions (V*) into N-phase voltage instructions (Vn*) to be applied to the first coil set (81) of N phases and the second coil set (82) of N phases, and generate the switching control signals (S) based on the N-phase voltage instructions (Vn*).

According to such vector control, the alternating-current rotating electrical machine (80) of N phases that rotates in an N-dimensional (N-phase) coordinate system can be controlled in the same two-dimensional (two-phase) coordinate system as a direct-current rotating electrical machine. Thus, feedback control of the rotating electrical machine (80) including the plurality of coil sets (8) can be appropriately performed.

In addition, it is preferred that when the inverter control device (30) performs feedback control of the rotating electrical machine (80) in the d-q-axis orthogonal vector coordinate system, the rotating electrical machine control system (100) include a rotation sensor (7) that detects rotation of the rotor (8r), and the inverter control device (30) perform coordinate transformation between an N-phase coordinate system and the d-q-axis orthogonal vector coordinate system, based on a rotational position (θ) of the rotor (8r) detected by the rotation sensor (7).

In vector control, the d-q-axis orthogonal vector coordinate system is a rotating coordinate system that rotates with respect to a fixed coordinate system of the stator (8s). Since the d-q-axis orthogonal vector coordinate system rotates according to rotation of the rotor (8r), it is preferred to perform coordinate transformation based on a rotational position (θ) of the rotor (8r) detected by the rotation sensor (7).

It is preferred that each of the coil sets (8) be star-connected three-phase coils in which coils of respective phases (8u, 8v, and 8w) are connected to each other at a neutral point (NP).

The inverters (50) connected to the direct-current power supply (41) and the alternating-current rotating electrical machine (80) are, in many cases, of a voltage-controlled type due to easiness of their control. Thus, it is preferred that the coil sets (8) of the rotating electrical machine (80) connected to the inverters (50) also have voltage type star connection in which, for example, in a case of three-phase alternating currents, line-to-line voltage is $3^{(1/2)}$ times (root 3 times) of phase voltage.

REFERENCE SIGNS LIST

5: Switching element, 6: Current sensor, 7: Rotation sensor, 8: Coil set, 8m: Permanent magnet, 8r: Rotor, 8u: U-phase coil (coil of each phase), 8v: V-phase coil (coil of each phase), 8w: W-phase coil (coil of each phase), 30: Inverter control device, 41: Direct-current power supply, 50: Inverter, 80: Rotating electrical machine, 81: First coil set, 100: Rotating electrical machine control system, I*: Two-phase current instructions, I1: First detection value, I2: Second detection value, In: Actual current, NP: Neutral point, S: Switching control signal, T*: Torque instruction (target torque), V*: Two-phase voltage instructions, Vn*: Three-phase voltage instructions (N-phase voltage instructions), and θ: Electrical angle (rotational position of the rotor)

The invention claimed is:

1. A rotating electrical machine control system for a vehicle's drive power source whose control target is an alternating-current rotating electrical machine including M coil sets (M is a natural number greater than or equal to 2) of N phases (N is a natural number), the rotating electrical machine control system comprising:
   M inverters each including a plurality of switching elements and connected to a direct-current power supply and one of the coil sets to convert electric power between a direct current and alternating currents of N phases;
   current sensors provided for each phase flowing through the coil sets; and
   an inverter control device that generates switching control signals for controlling the plurality of switching elements, to control the inverters,
   wherein the inverter control device performs current feedback control of the rotating electrical machine using all detection values for each of N phases obtained by the current sensors, to generate the switching control signals common to the M inverters, wherein
   the inverter control device obtains the actual current flowing through the rotating electric machine by averaging the detected values of the current sensors of M sets at the same timing, sets the current flowing in one of said coil sets as a target current, and performs current feedback control of said rotating electric machine based on the deviation between said actual current and said target current, to generate said switching control signals common to the M inverters, or
   the inverter control device obtains the actual current flowing through the rotating electric machine by adding up the detected values of M sets of current sensors at the same timing, sets the current flowing in the M sets of coils as the target current, and performs current feedback control of the rotating electric machine based on the deviation between the actual current and the target current, to generates said switching control signals common to the M inverters.

2. The rotating electrical machine control system according to claim 1, wherein
   the inverter control device performs feedback control of the rotating electrical machine in a d-q-axis orthogonal vector coordinate system, based on deviation between current instructions obtained based on target torque of the rotating electrical machine and the actual currents, the d-q-axis orthogonal vector coordinate system having a d-axis indicating a direction of a magnetic flux of permanent magnets provided in a rotor of the rotating electrical machine and a q-axis orthogonal to the d-axis, and
   the inverter control device
   transforms the actual currents into two-phase currents in the d-q-axis orthogonal vector coordinate system, the actual currents being alternating currents of N phases,
   computes two-phase voltage instructions in the d-q-axis orthogonal vector coordinate system, based on deviation between two-phase current instructions and the two-phase currents, the two-phase current instructions being the current instructions in the d-q-axis orthogonal vector coordinate system,
   transforms the two-phase voltage instructions into N-phase voltage instructions to be applied to the coil sets of N phases, and
   generates the switching control signals based on the N-phase voltage instructions.

3. The rotating electrical machine control system according to claim 2, comprising a rotation sensor that detects rotation of the rotor,
   wherein
   the inverter control device performs coordinate transformation between an N-phase coordinate system and the d-q-axis orthogonal vector coordinate system, based on a rotational position of the rotor detected by the rotation sensor.

4. The rotating electrical machine control system according to claim 1, wherein each of the coil sets is star-connected three-phase coils in which coils of respective phases are connected to each other at a neutral point.

* * * * *